United States Patent
Nambula et al.

(10) Patent No.: US 12,238,074 B2
(45) Date of Patent: Feb. 25, 2025

(54) SECURE COMMUNICATION BETWEEN NON-PAIRED DEVICES REGISTERED TO THE SAME USER

(71) Applicant: Ivanti, Inc., South Jordan, UT (US)

(72) Inventors: Venkata Nambula, Los Gatos, CA (US); Mohamad Raja Gani, San Francisco, CA (US); Mohammad Aamir, Seattle, WA (US)

(73) Assignee: Ivanti, Inc., South Jordan, UT (US)

( * ) Notice: Subject to any disclaimer, the term of this patent is extended or adjusted under 35 U.S.C. 154(b) by 181 days.

(21) Appl. No.: 18/193,611

(22) Filed: Mar. 30, 2023

(65) Prior Publication Data

US 2023/0318855 A1   Oct. 5, 2023

Related U.S. Application Data

(60) Provisional application No. 63/325,307, filed on Mar. 30, 2022.

(51) Int. Cl.
*H04L 29/06* (2006.01)
*H04L 9/08* (2006.01)
*H04L 9/32* (2006.01)
*H04L 9/40* (2022.01)
*H04W 12/069* (2021.01)

(52) U.S. Cl.
CPC ........ *H04L 63/0428* (2013.01); *H04L 9/0825* (2013.01); *H04L 9/0841* (2013.01); *H04L 9/085* (2013.01); *H04L 9/3268* (2013.01); *H04L 9/3273* (2013.01); *H04W 12/069* (2021.01)

(58) Field of Classification Search
None
See application file for complete search history.

(56) References Cited

U.S. PATENT DOCUMENTS

| | | | |
|---|---|---|---|
| 2011/0051642 A1* | 3/2011 | Krishnaswamy | H04W 40/10 370/389 |
| 2013/0185559 A1* | 7/2013 | Morel | G06Q 20/353 713/168 |
| 2020/0067907 A1* | 2/2020 | Avetisov | H04L 67/133 |
| 2020/0280855 A1* | 9/2020 | Avetisov | H04L 63/20 |

* cited by examiner

*Primary Examiner* — Bradley W Holder (57) ABSTRACT

A method of establishing communication with a second device via wireless communication channel that is not natively secure. The method includes performing mutual authentication between the first and second devices by receiving via the communication interface from the second device a FIDO public certificate of the second device and using a FIDO public key of the second device. The FIDO public key of the second device having been registered by the second device with a FIDO relying party in connection with a user identity associated with both the first device and the second device. The FIDO public key of the second device having been fetched by the first device from the FIDO relying party in connection with FIDO registration of the first device with the FIDO relying party in connection with the user identity. The method may include negotiating a shared secret used to engage in ongoing communication.

20 Claims, 4 Drawing Sheets

SECURE COMMUNICATION BETWEEN NON-PAIRED DEVICES REGISTERED TO THE SAME USER

CROSS REFERENCE TO RELATED APPLICATION

This application claims the benefit of and priority to U.S. Provisional Application No. 63/325,307, filed Mar. 30, 2022, which is incorporated herein by reference in its entirety.

FIELD

This application is related to secure communication between devices. In particular, some embodiments are related to secure communication between non-paired devices.

BACKGROUND

Bluetooth™ Low Energy or BLE enables mobile and other device, e.g., Internet of Things (IoT) devices, to communicate with each other and with fixed devices, such as desktop computers, over a short range. The BLE standards and protocols facilitate secure communication between paired devices, but in some contexts and use scenarios it may be necessary to communicate securely via BLE between devices that are not paired. For example, Bluetooth™ peripheral devices, such as wireless headsets, speakers, mouses and other pointer devices, keyboards, etc. may be paired with a desktop computer, but a desktop computer user's mobile phone may not be paired.

In conventional BLE systems, secure communication cannot be performed between unpaired devices. For instance, secure communication over BLE generally involves first pairing between the devices followed by specific sequences of communication of numeric comparisons etc. on each of the unpaired device. These processes involve additional manual steps and generate a communication interface that exists outside active communication. These steps are included in conventional systems because the devices do not have prior contact and not means of authenticating one another without active authentication actions by the user. Accordingly, there is a need in the art to enable secure communication between unpaired devices.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of establishing secured communication interface between a first managed device and a second managed device. The method may include initiating, by a second managed device, an authentication request of a first managed device on a wireless channel. The wireless channel includes a wireless communication channel that is not natively secure, and a single user is associated with the first managed device and the second managed device. Responsive to the authentication request, the method may include starting, by the first managed device, a mutual authentication process over the wireless channel. The mutual authentication process includes a communication of a certificate message having a mobile signing key that includes public key of the first managed device assigned during a passwordless authentication registration process. The public key of the first managed device is self-signed. The method may include requesting, by the first managed device, a certificate of the second managed device. The method may include verifying, by the second managed device, the public key of the first managed device. Verifying the public key of the first managed device is based on availability of the public key of the first managed device which is fetched by the second managed device from a unified endpoint management (UEM) management device following the passwordless authentication registration process and the public key of the first managed device being self-signed. After the public key of the first managed device is verified by the second managed device, the method may include communicating by the second managed device a certificate message to the first managed device. The certificate message includes a public key of the second managed device and is self-signed by the second managed device. The method may include verifying, by the first managed device, the public key of the second managed device. Verifying the public key of the second managed device is based on availability of the public key of the second managed device on the first managed device which is fetched by the first managed device from the UEM management device following the passwordless authentication registration process and the public key of the second managed device being self-signed. After the public key of the second managed device is verified by the first managed device, the method may include communicating, by the first managed device, a finished message to the second managed device. The method may include starting, by the first managed device, a key exchange during which a shared secret encryption key is agreed upon between the first managed device and the second managed device. The shared secret encryption key is used to encrypt and decrypt data communication messages between the first and second managed devices.

A further aspect of an embodiment may include non-transitory computer-readable medium having encoded therein programming code executable by one or more processors to perform or control performance of one or more of the operations of the methods of establishing secured communication interface described above.

An additional aspect of an embodiment may include compute device comprising one or more processors and a non-transitory computer-readable medium having encoded therein programming code executable by one or more processors to perform or control performance of one or more of the operations of the methods of establishing secured communication interface described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide secure communication between non-paired Bluetooth™ devices. In various embodiments, a first client running on a first managed device (e.g., a mobile client running on a mobile device) and a second client running on a second managed device (e.g., a desktop client running on a desktop computer) are registered with a same FIDO Relying Party as FIDO Clients associated with the same user. Since the first client and the second client are registered to the same user, each client knows the FIDO public keys of the other client. In various embodiments, the FIDO public keys of the other client are fetched during FIDO registration. In various embodiments, a FIDO desktop client initiates an authentication request with the mobile client on a designated/configured Bluetooth™ channel (i.e., a specific channel identified by its channel identifier or "channel ID"). The mobile client listens on the same channel and once authentication is initiated the clients use their previously registered and fetched respective FIDO public keys to mutually authenticate. Once mutually authenticated and/or during mutual authentication, the clients perform a key exchange and agree on a shared secret to be used to encrypt/decrypt ongoing communications between them on the Bluetooth™ channel.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
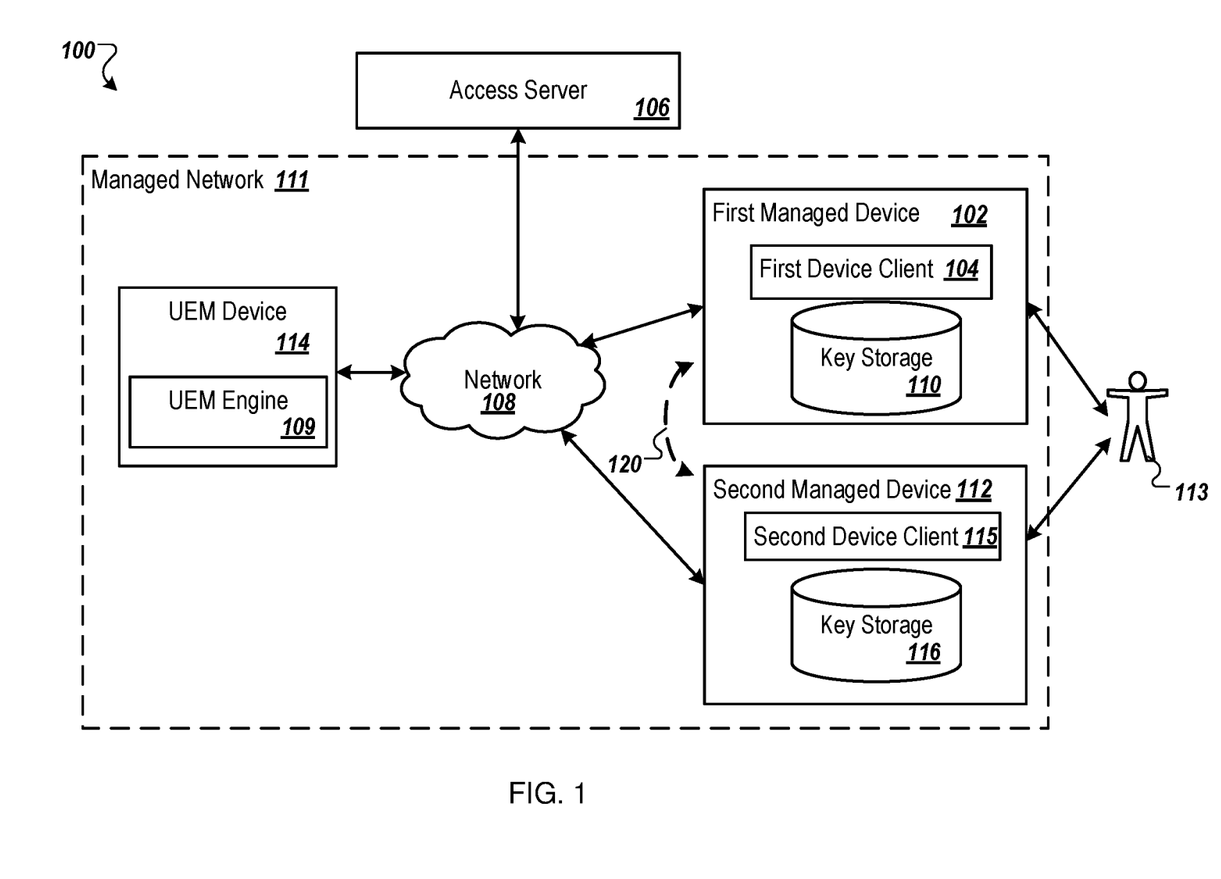
FIG. 1 depicts a block diagram of an example operating environment in which some embodiments described in the present disclosure may be implemented.

FIG. 1 is a block diagram illustrating an example operating environment 100 in which some embodiments of the present disclosure may be implemented. In some embodiments, a united endpoint management (UEM) engine 109 may communicate information with device clients 104 and 115 to provide secure communication between a first managed device 102 and a second managed device 112 while they are in an unpaired state. For instance, in the depicted embodiment the first managed device 102 and the second managed device 112 may both be associated with a user 113. In the present disclosure, the term "associated with" when referring to a relationship between the user 113 and the devices 102 and 112, may indicate that the user 113 is assigned to regularly interface with the devices 102 and 112. The UEM engine 109 may leverage a passwordless registration process to enable the devices 102 and the 112 to securely communicate via a communication interface 120 that is not natively secure and while the devices 102 and 112 are unpaired.

Accordingly, embodiments disclosed herein may overcome a technical limitation related to secure communication. For instance, in conventional systems the devices 102 and 112 may be paired prior to secure communication. In addition, in some conventional systems, establishing secure communication is not based on public/private key verification or shared secret session keys. Instead, these conventional systems may implement other security protocols.

The operating environment 100 of FIG. 1 includes an access server 106, the managed devices 102 and 112, the UEM device 114 that are configured to communicate data and information via a network 108 and a communication interface 120. Each of these components of the operating environment 100 are described in the following paragraphs.

The network 108 may include any communication network configured for communication of signals between the components (e.g., 114, 106, 102, and 112) of the operating environment 100. The network 108 may be wired or wireless. The network 108 may have configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

The communication interface 120 may include a channel of a natively unsecured protocol such as a channel of a Bluetooth protocol. An example of the communication interface may include a Bluetooth Low Energy (BLE) channel. In these and other embodiments, the managed devices 102 and 112 may be Bluetooth-enabled devices.

The access server 106 may include or implement a hardware-based computer device configured to communicate data and information with the other components of the operating environment 100 via the network 108. The access server 106 may be associated with a passwordless authentication system such as the access server implemented in the fast identification online (FIDO) system. The access server 106 may enable the managed devices 102 and 112 to register. During registration, the user 113 creates a new key pair. The public key is registered with the service and the user 113 retains the private key at a local device such as in the key storage 110 or 116. After registration, to authenticate, the user 113 proves possession of the private key by signing a challenge. The signed challenge is sent to the service, which verifies it using the public key. Signing the challenge may be performed by face recognition, fingerprints, entering a pin, etc. Some additional details of the FIDO registration are available at https://fidoalliance.org. In the FIDO example, the access server 106 may be referred to as a relying party.

The UEM device 114 may include or implement a hardware-based computer system that is configured to communicate with the other components of the operating environment 100 via the network 108. The UEM device 114 may include the UEM engine 109. The UEM engine 109 is configured to perform management operations relative to the managed devices 102 and 112. For instance, the UEM engine 109 may discover applications and products on the managed devices 102 and 112. In addition, the UEM engine 109 may perform communication controls, role management, and security settings at the managed devices 102 and 112.

The managed devices 102 and 112 may enroll with the UEM device 114 to create a managed network 111. The managed network 111 may be at least partially implemented remotely. For instance, the managed network 111 may be part of a SAAS and/or cloud-based system, which manages multiple groups of endpoints such as the managed devices 102 and 112. In these and other embodiments, the managed devices 102 and 112 may be one endpoint of multiple endpoints that is managed by the UEM device 114.

The managed network 111 is implemented to enable management of the managed devices 102 and 112 by the UEM device 114. Part of the management of the managed devices 102 and 112 may include role assignment, which may include associating both of the managed devices 102 and 112 with the user 113. In the depicted embodiment, include in the enrollment may include distribution of public keys between the managed devices 102 and 112 that are associated with the user 113. For instance, the first managed device 102 may be distributed one or more public keys of the second managed device 112 including a public key assigned during registration with the access server 106 and vice versa. Additionally or alternatively, because the user is associated with both the managed devices 102 and 112, the public keys may be fetched from the access server 106. For instance, the second managed device 112 may fetch the public key of the first managed device 102 from the access server 106. The public keys of other managed devices 102 or 112 may be stored in the key storage 116 or 110 in some embodiments.

In some embodiments, the managed devices 102 and 112 may be enrolled in the managed network 111. As part of an enrollment process, the clients 104 or 115, may be loaded to the managed devices 102 or 112, respectively. Once enrolled, communication of data, information, commands, notifications, or combinations thereof between the managed devices 102 and 112 and the UEM device 114 may occur. The managed network 111 may be associated with an enterprise, a portion of an enterprise, a government entity, or another entity or set of devices (e.g., 102 and 112).

The managed devices 102 and 112 may include a hardware-based computer system that is configured to communicate with the other components of the operating environment 100 via the network 108 and the communication interface 120. The managed devices 102 and 112 may include a computer device that may be managed by the UEM device 114 and/or has been enrolled in the managed network 111. The managed devices 102 and 112 might include workstations of an enterprise, servers, data storage systems, printers, telephones, internet of things (IOT) devices, smart watches, sensors, automobiles, battery charging devices, scanner devices, etc. The managed devices 102 and 112 may also include virtual machines, which may include a portion of a single processing unit or one or more portions of multiple processing units, which may be included in multiple machines. In the depicted embodiment, the first managed device 102 may include a mobile device of the user 113 and the second managed device 112 may include a desktop device or laptop computer of the user 113.

The managed devices 102 and 112 may be associated with the user 113. The user 113 may be an individual, a set of individuals, or a computer system that is associated with the managed devices 102 and 112. In some embodiments, the user 113 may provide input to the managed devices 102 and 112. The input provided by the user 113 may include credentials information etc. that may be used in one or more of the secure communication operations described in this disclosure.

Each of the managed devices 102 and 112 include one of the clients 104 or 115. The clients 104 and 115 may be implemented to perform one or more operations for secure communication between unpaired devices via the communication interface 120. In general, in embodiments implemented with a FIDO authentication system, secure communications over the communication interface 120 may be performed at least in part by the clients 104 and 115 using their respective FIDO public certificates and previously fetched FIDO public signing key of the other client 104 or 115 to perform mutual authentication. After the managed devices 102 and 112 are mutually authenticated and/or during mutual authentication, the clients 104 and 115 may perform a key exchange and agree on a shared secret to encrypt/decrypt ongoing communications (e.g., messages) between them over the communication interface 120.

For instance, the clients 104 and 115 may register with the access server 106 via the network 108 and to act as an authenticator and client to register one or more key pairs. The key pairs may include a signing key pair, which may be stored in the key storage 110 or 116. The clients 104 and 115 may also create a self-signed certificate for its public key. Additionally, the clients 104 and 115 may fetch the public keys of the other managed devices 102 and 112 associated with the user 113. Accordingly, each of the managed devices 102 and 112 may have a self-signed certificate for itself and may have stored on the key storage 110 or 116 the fetched public key of the other managed device 102 or 112.

Secure communication between the managed devices 102 and 112 may be established by communicating the self-signed certificates via the communication interface 120. The self-signed certificates may be verified using the stored public key stored in the key storage 110 or 116. Verification of the self-signed certificates may authenticate the managed devices 102 and 112. Following authentication, the managed devices 102 and 112 may agree on a shared secret to encrypt and decrypt messages communicated between the managed devices 102 and 112.

In some embodiments, the secure communication may be established when the managed devices 102 and 112 are not connected via the network 108 to the UEM device 114 or one another. This state is sometimes referred to in the present disclosure as an offline mode. In these and other embodiments, while in the offline mode, the managed devices 102 and 112 may only be in communication with one another via the communication interface 120.

In some embodiments, using self-signed FIDO public key certificates to perform mutual authentication between unpaired devices 102 and 112 over a BLE or other Bluetooth (or other) wireless communication channel (e.g., 120) enables a secure channel to be established and used in an offline mode and without the overhead of certificate verification from a certificate authority, because under the approach disclosed herein, the FIDO public keys of the other client 104 or 115 is already available to each client 104 or 115.

In some embodiments, the clients 104 and 115 may also be configured to invalidate one or both public keys. The public keys may be invalidated based at least in part on an amount of time the managed devices 102 or 112 are offline or in an offline mode. Invalidity of the public key(s) may provide an additional level of security. For instance, extended periods of time in an offline mode may be indicative of the managed device 102 or 112 being placed in a less secure and undetected state. In some embodiments, the client 104 or 115 may monitor when the managed device 102 or 112 is in the offline mode. In response to the managed device 102 or 112 being placed in the offline mode, a timer may start. The timer ends when the managed device 102 or 112 communicates via the network 108 to the UEM device 114. Responsive to the time in the offline mode being below a predetermined time period, the public key(s) may remain valid. However, responsive to the time being above the predetermined time, the public key(s) may be invalidated, which may prevent establishment of the secured communication interface. The predetermined time period may be one day, a few days, a few hours, or another suitable duration.

The UEM engine 109, the clients 104 and 115, and components thereof may be implemented using hardware including a processor, a microprocessor (e.g., to perform or control performance of one or more operations), a field-programmable gate array (FPGA), or an application-specific integrated circuit (ASIC). In some other instances, the UEM engine 109, the clients 104 and 115, and components thereof may be implemented using a combination of hardware and software. Implementation in software may include rapid activation and deactivation of one or more transistors or transistor elements such as may be included in hardware of a computing system (e.g., the managed devices 102 or 112 or the UEM device 114 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 111, one or more access servers 106, one or more UEM devices 114, two or more managed devices 102 or 112, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together into a single component or server or separated into multiple components or servers. For example, in some embodiments, the UEM device 114 and the access server 106 may include a single server, a set of servers, a virtual device, a virtual server, one or more computer programs which manages access to computing resource or services, a cloud-based network of servers.

Figure 2:
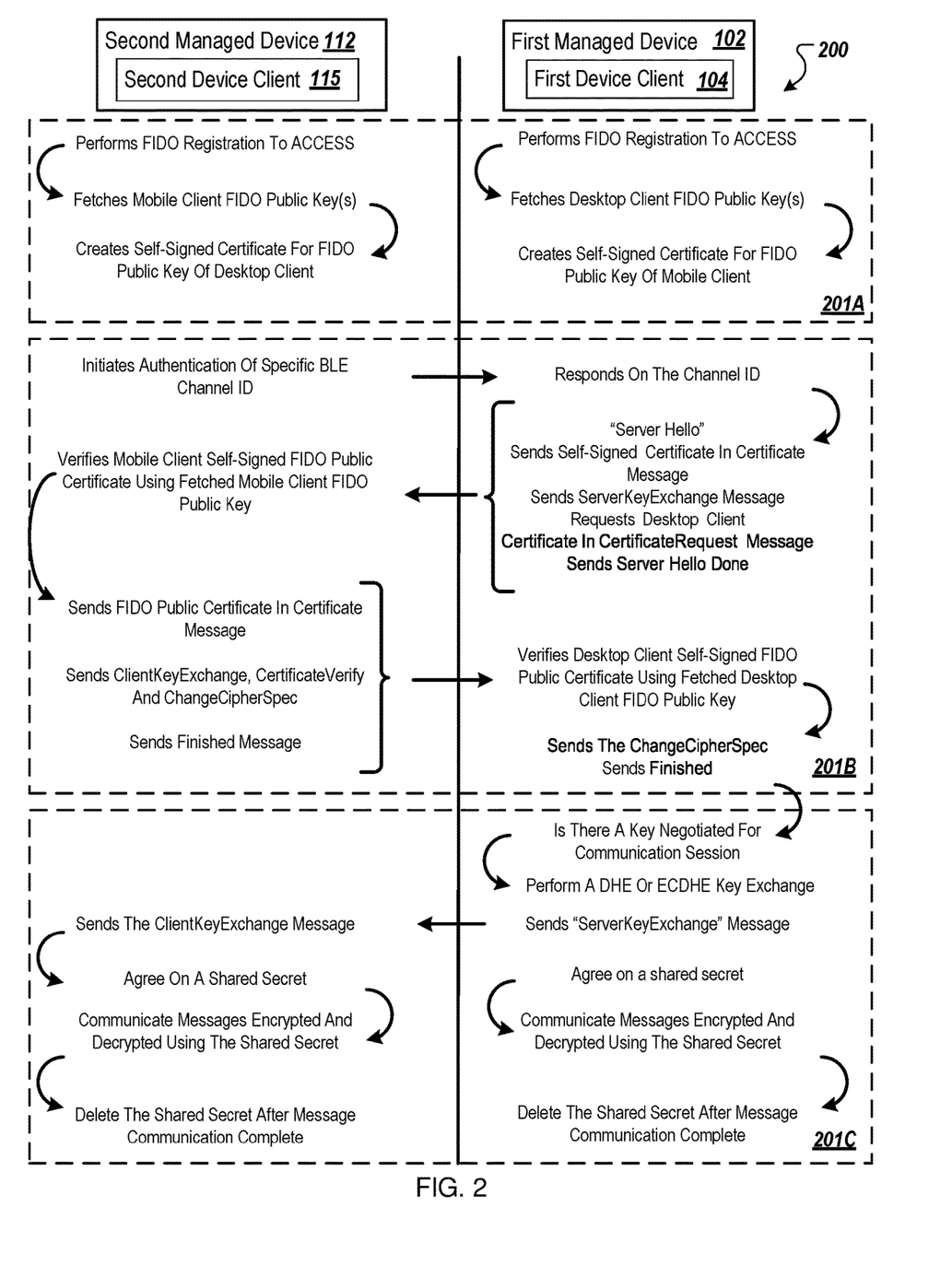
FIG. 2 is a flow diagram illustrating a communication process that may be implemented in the operating environment of FIG. 1.

FIG. 2 is a flow diagram illustrating a communication process 200 that may be implemented in the operating environment 100 of FIG. 1 or another suitable environment. FIG. 2 includes the second device client 115 and the first device client 104 of FIG. 1. Although not depicted in FIG. 2, communication of data and information may be via a communication interface such as the communication interface 120 of FIG. 1. As described with reference to FIG. 1, the second device client 115 may be included in the second managed device 112 and the first device client 104 may be included in the first managed device 102. In the example of FIG. 2, the second managed device 112 includes a desktop computer and the first managed device includes a mobile device. Accordingly, in FIG. 2, some of the operations are described as "mobile" referring to the first managed device 102 and "desktop" referring to the second managed device. As discussed with reference to FIG. 1, the first and the second managed devices 102 and 112 are associated with the user 113. Additionally, in the depicted embodiment the first and second managed devices 102 and 112 may be Bluetooth enabled and the communication interface may include a Bluetooth or BLE channel.

The communication process 200 may be separated into three parts, generally indicated by 201A-201C. A first part 201A includes steps for preparation to establish the secure communication. A second part 201B includes steps for authentication. A third part 201C includes steps for communication between the clients 104 and 115. In some embodiments, one or more of the parts 201A-201C may repeated each time the devices 102 and 112 communicate via the communication interface 120. For example, the first part 201A may occur once and the second and third parts 201B and 201C may occur each time the managed devices 102 and 112 communicate.

In the first part 201A, the clients 115 and 104 may prepare for secure communications. The steps in the first part 201A may include performance of a FIDO registration as discussed with reference to FIG. 1. Following the registration, the clients 115 and 104 fetch public keys of the other device. For instance, the second device client 115 may fetch the FIDO public key of the first managed device 102 and the first device client 104 may fetch the FIDO public key of the second managed device 112. The fetched public keys may be stored locally, for instance in secured key storage such as the key storage 110 or 116. Additionally, in the first part 201A of the communication process 200, the clients 104 and 115 create a self-signed certificate. The self-signed certificate may be for the FIDO public key. For instance, the second device client 115 may create a self-signed certificate for the FIDO public key of the desktop client and the first device client 104 may create a self-signed certificate for the FIDO public key of the mobile client.

Following the first part, the managed devices 102 and 112 may have stored the FIDO public key of the other device 102 or 112. Additionally, the managed devices 102 and 112 may have created a self-signed certificate for their FIDO public key.

The second part 201B includes operations through which the managed devices 102 and 112 authenticate one another via the natively unsecured channel. The operations of the second part 201B may enable establishment of a secured communication interface between unpaired Bluetooth™ devices (e.g., the first and second managed devices 102 and 112). The operations of the second part 201B may generally follow and may be similar to and/or formatted according to a Transport Layer Security (TLS) authentication. In some embodiments, the clients 104 and 115 mutually authenticate over the Bluetooth™ channel in the same (or a similar) manner as mutual authentication over TLS.

In the example shown, the second device client 115 initiates mutual authentication over a designated/configured Bluetooth™ channel such as a specific BLE channel ID. In some embodiments, communication may be initiated by the second device client 115 sending a ClientHello message as defined in the TLS mutual authentication protocol (e.g., mTLS).

The first device client 104 listens on the same BLE channel and responds with a "Server Hello" message. The first device client 104 sends its own self-signed public certificate to the second device client 115 over the BLE channel. In some embodiments, the first device client may send the "ServerKeyExchange" message. The first device client 104 requests that the second device client 115 send its FIDO public certificate and (optionally) sends the "ServerHelloDone" message.

The second device client 115 uses the FIDO public key registered previously by first device client 104 and fetched previously (or now, if online) by the second device client 115 to verify the self-signed public certificate received from first device client 104. In response to the verification indicating the self-signed certificate is valid, the second device client 115 sends its self-signed public certificate to the first device client 104. Additionally, if the first device client 104 sent the ServerKeyExchange message, the second device client 115 replies with the ClientKeyExchange message. In some embodiments, one or both of the ClientVerify and ChangeCipherSpec messages may also be sent. The second device client 115 ends with a "finished" message.

The first device client 104 verifies the self-signed public certificate received from second device client 115 using the public key previously fetched in the first part 201A. If the verification indicates the self-signed certificate received from second device client 115 is valid, the first device client 104 may (or may not) send the ChangeCipherSpec message, as defined in the TLS mutual authentication protocol. The first device client 104 ends with a "finished" message.

The third part 201C may be performed responsive to completion of the second part 201B. The third part 201C may begin by the first device client 104 may determine whether a key has been negotiated for a communication session. Responsive to a determination that the key has not been negotiated, the first device client 104 and the second device client 115 may perform an ECDHE or a DHE key exchange. For instance, the first device client 104 sends a "ServerKeyExchange" message and the second device client 115 sends the "ClientKeyExchange" message. After the key exchange is complete, the clients 104 and 115 agree on a shared secret. The shared secret is then used by the managed devices 102 and 112 to encrypt and decrypt messages during communications over the BLE channel. After the communication ends, the clients 104 and 115 delete the shared secret.

To communicate again in the future, the client 104 and 115 re-perform the second and third parts 201B and 201C to establish a new secure channel, re-authenticate the devices 102 and 112, and agree upon another shared secret.

Figure 3:
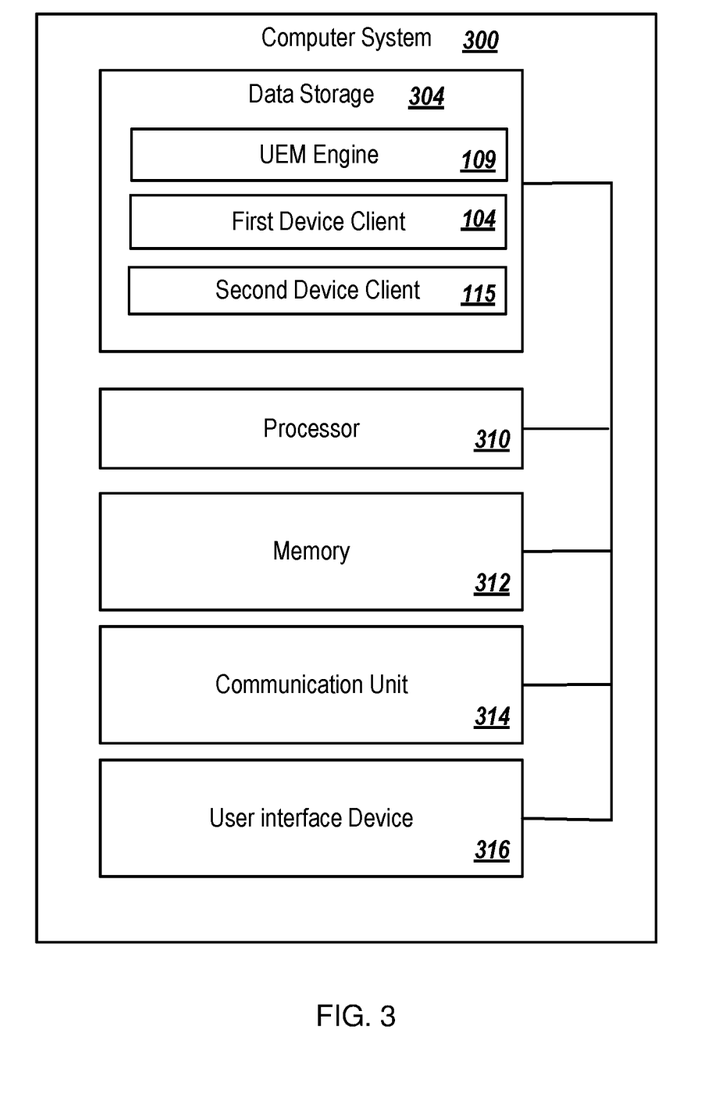
FIG. 3 illustrates an example computer system configured for establishing secured communication interface between a first managed device and a second managed device.

FIG. 3 illustrates an example computer system 300 configured for establishing secured communication interface between a first managed device and a second managed device, according to at least one embodiment of the present disclosure. The computer system 300 may be implemented in the operating environment 100 of FIG. 1, for instance. Examples of the computer system 300 may include the managed devices 102 and 112, the access server 106, the UEM device 114, or some combination thereof. The computer system 300 may include one or more processors 310, a memory 312, a communication unit 314, a user interface device 316, and a data storage 304 that includes the UEM engine 109, the first device client 104, the second device client 115, or some combination thereof (collectively modules 301) configured for product update management.

The processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 3, the processor 310 may more generally include any number of processors configured to perform individually or collectively any number of operations described in the present disclosure. Additionally, one or more of the processors 310 may be present on one or more different electronic devices or computing systems. In some embodiments, the processor 310 may interpret and/or execute program instructions and/or process data stored in the memory 312, the data storage 304, or the memory 312 and the data storage 304. In some embodiments, the processor 310 may fetch program instructions from the data storage 304 and load the program instructions in the memory 312. After the program instructions are loaded into the memory 312, the processor 310 may execute the program instructions.

The memory 312 and the data storage 304 may include computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations.

The communication unit 314 may include one or more pieces of hardware configured to receive and send communications. In some embodiments, the communication unit 314 may include one or more of an antenna, a wired port, and modulation/demodulation hardware, among other communication hardware devices. In particular, the communication unit 314 may be configured to receive a communication from outside the computer system 300 and to present the communication to the processor 310 or to send a communication from the processor 310 to another device or network (e.g., 108 of FIG. 1).

The user interface device 316 may include one or more pieces of hardware configured to receive input from and/or provide output to a user. In some embodiments, the user interface device 316 may include one or more of a speaker, a microphone, a display, a keyboard, a touch screen, or a holographic projection, among other hardware devices.

The modules 301 may include program instructions stored in the data storage 304. The processor 310 may be configured to load the modules 301 into the memory 312 and execute the modules 301. Alternatively, the processor 310 may execute the modules 301 line-by-line from the data storage 304 without loading them into the memory 312.

Modifications, additions, or omissions may be made to the computer system 300 without departing from the scope of the present disclosure. For example, in some embodiments, the computer system 300 may not include the user interface device 316. In some embodiments, the different components of the computer system 300 may be physically separate and may be communicatively coupled via any suitable mechanism. For example, the data storage 304 may be part of a storage device that is separate from a device, which includes the processor 310, the memory 312, and the communication unit 314, that is communicatively coupled to the storage device. The embodiments described herein may include the use of a special-purpose or general-purpose computer including various computer hardware or software modules, as discussed in greater detail below.

Figure 4:
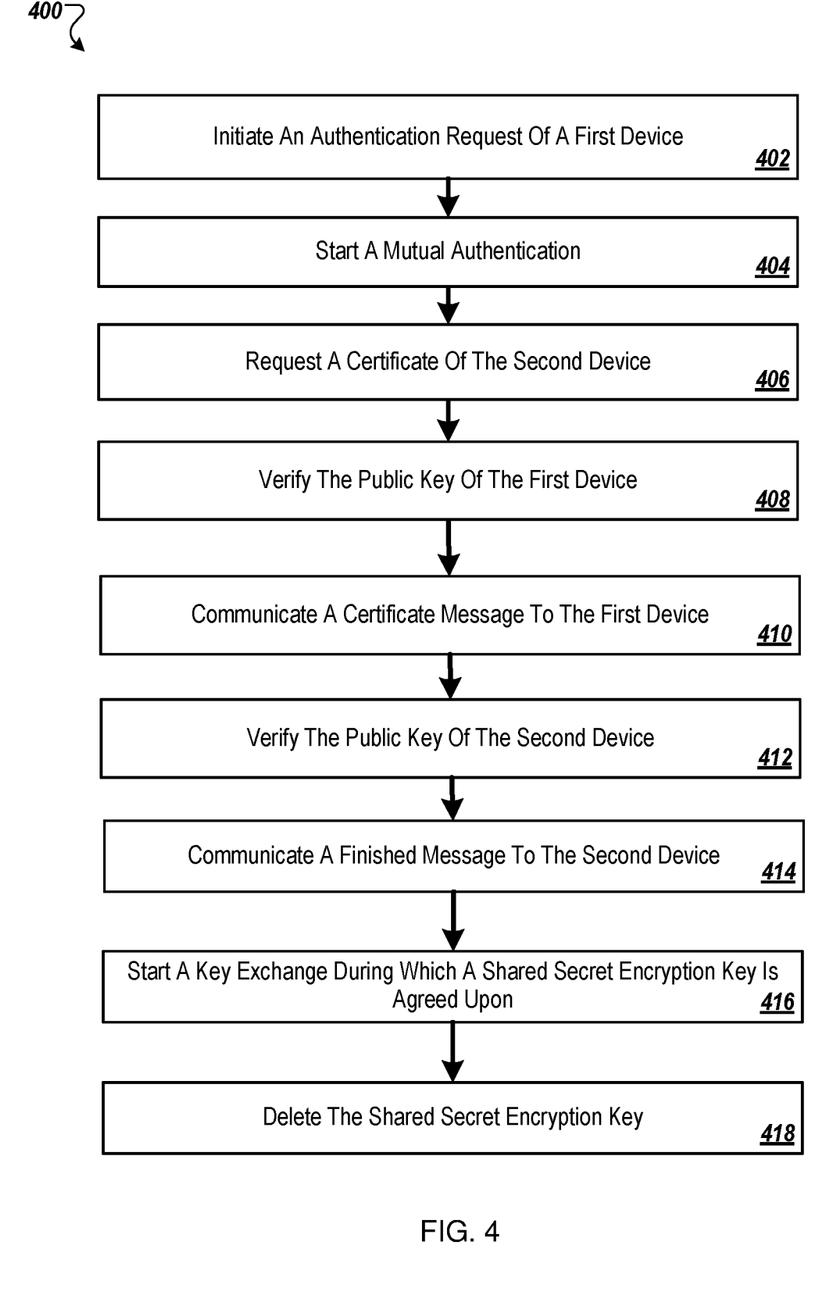
FIG. 4 is a flow chart of an example method of establishing secured communication interface between a first managed device and a second managed device, all according to at least one embodiment described in the present disclosure.

FIG. 4 is a flow chart of an example method 400 of establishing secured communication interface between a first managed device and a second managed device, according to at least one embodiment of the present disclosure. The first and second managed devices implementing the method 400 may be associated with a single user such as the first and second managed devices 102 and 112 of FIG. 1 or clients thereof. The method 400 may be performed while the first and second managed devices are offline or using the secured communication interface as a primary communication interface.

The method 400 may begin at block 402 in which an authentication request of a first managed device may be initiated. The authentication request may be initiated by a second managed device on a wireless channel. The wireless channel includes a wireless communication channel that is not natively secure. In some embodiments, the first managed device and the second managed device are an unpaired set of devices registered to a single user. In some embodiments, the initiating the authentication request of the first managed device occurs when one or both of the first managed device and the second managed device is not connected to the Internet or another suitable communication network. For instance, in these and other embodiments, the first managed device includes a mobile device of the user and the second managed device includes a desktop device of the user.

Additionally, in some embodiments, the wireless communication channel may include a specific Bluetooth™ Low Energy (BLE) channel, which may be associated with a BLE channel identifier. In these and other embodiments, the first managed device may be configured to listen on the BLE channel and to respond to initiation of communication by the second managed device.

At block 404, a mutual authentication process may be started. The mutual authentication process may be started by the first managed device over the wireless channel. The mutual authentication process may be started responsive to the authentication request (e.g., block 402). The mutual authentication process may be started by communication of a certificate message. The certificate message may have a mobile signing key (MSK) that includes a public key of the first managed device. The public key of the first managed device, which may have been assigned during a passwordless authentication registration process. Additionally, the public key of the first managed device may be self-signed. In some embodiments, the passwordless authentication registration process includes a fast identity online (FIDO) process.

At block 406, a certificate of the second managed device may be requested. The certificate of the second managed device may be requested by the first managed device. At block 408, the public key of the first managed device may be verified. The public key of the first managed device may be verified by the second managed device. In some embodiments, verification of the public key of the first managed device is based on availability of the public key of the first managed device on or at the second managed device. For instance, the public key of the first managed device may be fetched by the second managed device from a unified endpoint management (UEM) management device following the passwordless authentication registration process. Availability of the public key of the first managed device and the self-signed certificate may enable verification of the self-signed public key of the first managed device.

At block 410, a certificate message may be communicated to the first managed device. The certificate message may be communicated by the second managed device to the first managed device after the public key of the first managed device is verified by the second managed device. The certificate message includes a public key of the second managed device that is self-signed by the second managed device.

At block 412, the public key of the second managed device may be verified by the first managed device. Similar to verification described in block 408, verification the public key of the second managed device is based on availability of the public key of the second managed device on or at the first managed device because the public key of the second managed device has fetched by the first managed device from the UEM management device following the passwordless authentication registration process. The availability of the public key of the second managed device at the first managed device enables verification of the self-signed the public key.

At block 414, a finished message may be communicated. The finished message may be communicated after the public key of the second managed device is verified by the first managed device. At block 416, a key exchange may be started. During the key exchange, a shared secret encryption key may be agreed upon between the first managed device and the second managed device. The shared secret encryption key is used to encrypt and decrypt data communication messages between the first and second managed devices. In some embodiments, the key exchange includes a Diffie-Heilman key (DHE) key exchange. After the shared secret encryption key is agreed upon, messages communicated between the first and second managed devices may be encrypted and decrypted using the encryption key. The messages may be communicated via the communication interface of block 402.

At block 418, the shared secret encryption key may be deleted. The shared secret encryption key may be deleted by the first and the second managed devices after communication between the first and second managed devices ends. In some embodiments, one or more of blocks 402, 404, 406, 408, 410, 412, 414 may be performed according to the Transport Layer Security (TLS) protocol. For instance, the authentication request includes a client hello message formatted according to a TLS protocol.

Modifications, additions, or omissions may be made to the method 400 without departing from the scope of the present disclosure. For example, in some embodiments, the method 400 may include invalidating one or more public key based at least in part on an amount of time in offline mode. Invalidation of the public key(s) may be performed to provide additional security if the first or second managed devices are offline for an extended period. In these and other embodiments, the public key of another device or client registered to the same user may be invalidated after a prolonged period of being offline. For instance, the method 400 may include monitoring to detect if/when one or both of the first and second managed devices is in an offline mode. If one or both of the devices is determined to be offline, a timer is started. If the timer expires prior to the device being back online, it is determined at 508 that the previously fetched public key(s) of other devices registered to the same user are to be expired or invalid. If prior to the key expiration timer expiring the device is determined to be back online (i.e., connected to the network 108 and/or UEM device 114 of FIG. 1), the monitoring continues process until the device is shut down.

The method 400 may be performed in a suitable operating environment such as the operating environment 100 of FIG. 1. The method 400 may be performed by the managed devices 102 and 112 or clients 104 and 115 thereon described elsewhere in the present disclosure or by another suitable computing system, such as the computer system 300 of FIG. 3. In some embodiments, the managed devices 102 and 112 or the other computing system may include or may be communicatively coupled to a non-transitory computer-readable medium (e.g., the memory 312 of FIG. 3) having stored thereon programming code or instructions that are executable by one or more processors (such as the processor 310 of FIG. 3) to cause a computing system or the managed devices 102 and 112 to perform or control performance of the method 400. Additionally or alternatively, the managed devices 102 and 112 may include the processor 310 that is configured to execute computer instructions to cause the managed devices 102 and 112 or another computing systems to perform or control performance of the method 400. The managed devices 102 and 112 or the computer system 300 implementing the methods 500 and 600 may be included in a cloud-based managed network, an on-premises system, or another suitable network computing environment. Although illustrated as discrete blocks, one or more blocks in FIG. 4 may be divided into additional blocks, combined into fewer blocks, or eliminated, depending on the desired implementation.

Further, modifications, additions, or omissions may be made to the method 400 without departing from the scope of the present disclosure. For example, the operations of method 400 may be implemented in differing orders. Furthermore, the outlined operations and actions are only provided as examples, and some of the operations and actions may be optional, combined into fewer operations and actions, or expanded into additional operations and actions without detracting from the disclosed embodiments.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the embodiments and the concepts contributed to furthering the art and are to be construed as being without limitation to such specifically recited examples and conditions. Although embodiments have been described in detail, various changes, substitutions, and alterations could be made hereto without departing from the scope of the embodiments.

What is claimed is:

1. A method of establishing secured communication interface between a first managed device and a second managed device, the method comprising:
    initiating, by a second managed device, an authentication request of a first managed device on a wireless channel, wherein the wireless channel includes a wireless communication channel that is not natively secure, and a single user is registered with the first managed device and the second managed device;
    responsive to the authentication request, starting, by the first managed device a mutual authentication process over the wireless channel, wherein the mutual authentication process includes a communication of a certificate message having a mobile signing key that includes public key of the first managed device assigned during a passwordless authentication registration process, and wherein the public key of the first managed device is self-signed;
    requesting, by the first managed device, a certificate of the second managed device;
    verifying by the second managed device, the public key of the first managed device, wherein verifying the public key of the first managed device is based on availability of the public key of the first managed device on the second managed device which is fetched by the second managed device from a unified endpoint management (UEM) management device following the passwordless authentication registration process and the public key of the first managed device being self-signed;
    after the public key of the first managed device is verified by the second managed device, communicating by the second managed device a certificate message to the first managed device, wherein the certificate message includes a public key of the second managed device and is self-signed by the second managed device;
    verifying, by the first managed device, the public key of the second managed device, wherein verifying the public key of the second managed device is based on availability of the public key of the second managed device on the first managed device which is fetched by the first managed device from the UEM management device following the passwordless authentication registration process and the public key of the second managed device being self-signed;
    after the public key of the second managed device is verified by the first managed device, communicating, by the first managed device a finished message to the second managed device; and
    starting, by the first managed device a key exchange during which a shared secret encryption key agreed upon between the first managed device and the second managed device, wherein the shared secret encryption key is used to encrypt and decrypt data communication messages between the first and second managed devices.

2. The method of claim 1, wherein the passwordless authentication registration process includes a fast identity online (FIDO) process.

3. The method of claim 1, wherein the wireless communication channel comprises a specific Bluetooth™ Low Energy (BLE) channel associated with a BLE channel identifier.

4. The method of claim 3, wherein the first managed device is configured to listen on the BLE channel and to respond to initiation of communication by the second managed device.

5. The method of claim 1, wherein the key exchange includes Diffie-Hellman key (DHE) key exchange.

6. The method of claim 1, wherein the first managed device and the second managed device comprise an unpaired set of devices.

7. The method of claim 1, wherein the first managed device includes a mobile device and the second managed device includes a desktop device.

8. The method of claim 1, wherein the authentication request includes a client hello message formatted according to a Transport Layer Security (TLS) protocol.

9. The method of claim 1, wherein the initiating the authentication request of the first managed device occurs when one or both of the first managed device and the second managed device is in an offline mode.

10. The method of claim 1, further comprising deleting the shared secret encryption key by the first and the second managed devices after communication between the first and second managed devices ends.

11. A non-transitory computer-readable medium having encoded therein programming code executable by one or more processors to perform or control performance of operations to establish a secured communication interface between a first managed device and a second managed device, the operations comprising:
    initiating, by a second managed device, an authentication request of a first managed device on a wireless channel, wherein the wireless channel includes a wireless communication channel that is not natively secure, and a single user is registered with the first managed device and the second managed device;
    responsive to the authentication request, starting, by the first managed device a mutual authentication process over the wireless channel, wherein the mutual authentication process includes a communication of a certificate message having a mobile signing key that includes public key of the first managed device assigned during a passwordless authentication registration process, and wherein the public key of the first managed device is self-signed;
    requesting, by the first managed device, a certificate of the second managed device;
    verifying by the second managed device, the public key of the first managed device, wherein verifying the public key of the first managed device is based on availability of the public key of the first managed device on the second managed device which is fetched by the second managed device from a unified endpoint management (UEM) management device following the passwordless authentication registration process and the public key of the first managed device being self-signed;
    after the public key of the first managed device is verified by the second managed device, communicating by the second managed device a certificate message to the first managed device, wherein the certificate message includes a public key of the second managed device and is self-signed by the second managed device;
    verifying, by the first managed device, the public key of the second managed device, wherein verifying the public key of the second managed device is based on availability of the public key of the second managed device on the first managed device which is fetched by the first managed device from the UEM management device following the passwordless authentication registration process and the public key of the second managed device being self-signed;

after the public key of the second managed device is verified by the first managed device, communicating, by the first managed device a finished message to the second managed device; and starting, by the first managed device a key exchange during which a shared secret encryption key agreed upon between the first managed device and the second managed device, wherein the shared secret encryption key is used to encrypt and decrypt data communication messages between the first and second managed devices.

12. The non-transitory computer-readable medium of claim 11, wherein the passwordless authentication registration process includes a fast identity online (FIDO) process.

13. The non-transitory computer-readable medium of claim 11, wherein the wireless communication channel comprises a specific Bluetooth™ Low Energy (BLE) channel associated with a BLE channel identifier.

14. The non-transitory computer-readable medium of claim 13, wherein the first managed device is configured to listen on the BLE channel and to respond to initiation of communication by the second managed device.

15. The non-transitory computer-readable medium of claim 11, wherein the key exchange includes Diffie-Hellman key (DHE) key exchange.

16. The non-transitory computer-readable medium of claim 11, wherein the first managed device and the second managed device comprise an unpaired set of devices.

17. The non-transitory computer-readable medium of claim 11, wherein the first managed device includes a mobile device and the second managed device includes a desktop device.

18. The non-transitory computer-readable medium of claim 11, wherein the authentication request includes a client hello message formatted according to a Transport Layer Security (TLS) protocol.

19. The non-transitory computer-readable medium of claim 11, wherein the initiating the authentication request of the first managed device occurs when one or both of the first managed device and the second managed device is in an offline mode.

20. The non-transitory computer-readable medium of claim 11, wherein the operations further comprise deleting the shared secret encryption key by the first and the second managed devices after communication between the first and second managed devices ends.

* * * * *